(12) United States Patent
Steen et al.

(10) Patent No.: US 9,708,865 B2
(45) Date of Patent: Jul. 18, 2017

(54) RATCHETING ANTI-ROTATION LOCK FOR THREADED CONNECTORS

(71) Applicant: Vetco Gray Inc., Houston, TX (US)

(72) Inventors: Thomas L. Steen, Houston, TX (US); Daniel C. Benson, Houston, TX (US); David L. Ford, Houston, TX (US); Christopher Loftin, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 939 days.

(21) Appl. No.: 13/713,790

(22) Filed: Dec. 13, 2012

(65) Prior Publication Data

US 2014/0167408 A1  Jun. 19, 2014

(51) Int. Cl.
*F16L 15/08* (2006.01)
*E21B 17/043* (2006.01)

(52) U.S. Cl.
CPC ............ *E21B 17/043* (2013.01); *F16L 15/08* (2013.01)

(58) Field of Classification Search
USPC .................................. 285/39, 81–82, 90–92
See application file for complete search history.

(56) References Cited

U.S. PATENT DOCUMENTS

| | | | | |
|---|---|---|---|---|
| 448,165 A | * | 3/1891 | Robison ................ | E21B 17/043 285/81 |
| 532,589 A | * | 1/1895 | Schmidt ............... | B65D 39/084 285/92 |
| 643,358 A | * | 2/1900 | Konold ................. | F16L 37/252 285/85 |
| 673,572 A | * | 5/1901 | Barrow .................. | F16K 41/02 285/92 |
| 903,435 A | * | 11/1908 | Barrott .................. | E21B 17/043 285/82 |
| 965,286 A | * | 7/1910 | Ferguson ............ | F16L 37/1215 285/34 |
| 1,064,527 A | * | 6/1913 | Norris ................... | E21B 17/043 285/91 |
| 1,407,335 A | * | 2/1922 | Reynolds ............ | B23B 31/1107 285/85 |
| 1,534,916 A | | 4/1925 | Campbell | |
| 1,540,374 A | * | 6/1925 | Stevens ................. | B25D 17/04 285/92 |

(Continued)

OTHER PUBLICATIONS

International Search Report and Written Opinion issued in connection with corresponding PCT Application No. PCT/US2013/072166 dated Oct. 24, 2014.

*Primary Examiner* — David E Bochna
(74) *Attorney, Agent, or Firm* — Hogan Lovells US LLP

(57) ABSTRACT

A pipe connection includes a pin having external threads and a box having internal threads. A circumferentially extending row of pin teeth are located on an exterior portion of the pin. A slot extends through a side wall of the box. A key is carried in the slot, the key having a row of key teeth that mate with the pin teeth. The key is mounted to the box such that a movable portion of the key is radially movable relative to the box between radially outward and radially inward positions. The key is biased toward the inward position, so that the key teeth ratchet on the pin teeth during make-up of the pin and the box. The key and pin teeth have a saw-tooth configuration to resist unscrewing rotation of the pin and the box. The key may be an integral part of the side wall of the box or a separate component.

7 Claims, 3 Drawing Sheets

(56) References Cited

U.S. PATENT DOCUMENTS

| | | | | |
|---|---|---|---|---|
| 1,580,694 | A * | 4/1926 | Smith | F16L 37/101 285/86 |
| 1,691,599 | A * | 11/1928 | Zimmermann | B25D 17/04 285/92 |
| 1,717,186 | A | 6/1929 | Cargle | |
| 1,969,431 | A * | 8/1934 | Skinner | E21B 17/06 285/36 |
| 2,118,350 | A * | 5/1938 | Holt | E21B 17/043 285/86 |
| 2,535,435 | A * | 12/1950 | Massey | 285/36 |
| 3,069,187 | A * | 12/1962 | Collims | F16L 17/063 285/93 |
| 3,201,149 | A * | 8/1965 | Bragg | F16L 19/00 285/93 |
| 3,608,933 | A * | 9/1971 | Lee | E21B 17/043 285/89 |
| 4,094,539 | A * | 6/1978 | Reimert | 285/309 |
| 4,185,937 | A * | 1/1980 | Anderson | F01D 5/026 403/316 |
| 4,407,529 | A * | 10/1983 | Holman | H01R 13/622 285/93 |
| 4,711,471 | A | 12/1987 | Pallini, Jr. et al. | |
| 4,757,593 | A | 7/1988 | Pallini, Jr. et al. | |
| 4,793,754 | A * | 12/1988 | Nobileau | E21B 17/042 411/186 |
| 4,830,408 | A * | 5/1989 | Reimert | 285/27 |
| 4,902,047 | A | 2/1990 | Marietta et al. | |
| 4,940,260 | A * | 7/1990 | Uriarte Odriozola | F16B 39/24 285/92 |
| 5,044,676 | A | 9/1991 | Burton et al. | |
| 5,188,398 | A * | 2/1993 | Parimore, Jr. | F16L 19/005 285/92 |
| 5,215,336 | A * | 6/1993 | Worthing | F16L 19/005 285/92 |
| 5,746,454 | A * | 5/1998 | Webb | F16L 39/005 285/92 |
| 5,785,357 | A * | 7/1998 | Foster | F16L 15/08 285/92 |
| 5,882,044 | A * | 3/1999 | Sloane | F16L 19/005 285/92 |
| 5,957,716 | A * | 9/1999 | Buckley | H01R 13/622 285/92 |
| 6,142,535 | A * | 11/2000 | Nishio | F16L 19/005 285/92 |
| 6,334,632 | B1 * | 1/2002 | Nishio | F16L 47/04 285/92 |
| 6,425,705 | B1 * | 7/2002 | Ingram | A46B 17/02 401/290 |
| 6,619,392 | B2 | 9/2003 | Marangoni et al. | |
| 6,695,059 | B2 | 2/2004 | Deocampo et al. | |
| 6,824,170 | B2 * | 11/2004 | Lee | F16L 37/086 285/92 |
| 7,146,704 | B2 | 12/2006 | Otten et al. | |
| 7,156,424 | B2 * | 1/2007 | McCord | F16L 19/005 285/92 |
| 7,431,342 | B2 * | 10/2008 | Sauer | F16B 7/182 285/92 |
| 7,571,937 | B2 * | 8/2009 | Patel | F16L 19/005 285/92 |
| 7,600,789 | B2 * | 10/2009 | Vyse | F16L 19/005 285/91 |
| 7,938,452 | B2 * | 5/2011 | Katsura | F16L 41/10 285/92 |
| 8,240,715 | B2 * | 8/2012 | Itou | F16L 19/005 285/92 |
| 8,555,765 | B2 * | 10/2013 | Graham, II | F41A 21/325 285/92 |
| 9,279,526 | B2 * | 3/2016 | McAlister | F16L 19/005 |
| 2002/0070544 | A1 * | 6/2002 | Kingsford | F16L 15/00 285/92 |
| 2004/0017077 | A1 * | 1/2004 | Vyse | F16L 19/005 285/92 |
| 2005/0258640 | A1 * | 11/2005 | Otten | F16L 15/08 285/92 |
| 2007/0164566 | A1 * | 7/2007 | Patel | F16L 19/005 285/386 |
| 2011/0260445 | A1 | 10/2011 | Watterson, II et al. | |
| 2012/0103625 | A1 | 5/2012 | Yates | |
| 2012/0267456 | A1 * | 10/2012 | Imagawa | F16L 19/005 285/86 |

* cited by examiner

RATCHETING ANTI-ROTATION LOCK FOR THREADED CONNECTORS

FIELD OF THE DISCLOSURE

This invention relates in general to threaded tubular connections, such as for offshore oil well large diameter pipe, and particularly to a device to prevent rotation of the members after they are made up.

BACKGROUND OF THE INVENTION

Oil and gas wells can have several strings of casing of differing diameters cemented in the well. Each casing string is usually made up of joints of pipe having threaded ends secured together. A typical casing joint has external threads on its upper and lower ends. A casing collar with internal threads secures the threaded ends together. In larger casing diameters, a casing collar with internal threads may be affixed, such as by welding, to one end of each pipe, the other end having external threads. Normally, the operator relies on the friction of the made-up joint preventing the threaded connectors from loosening while running the string into the well. With larger diameter casing, for example, from 16 inch to 36 inch, the friction of the made-up connector may be inadequate to prevent loosening while running the casing.

Operators have employed anti-rotation keys to prevent loosening. A rectangular pocket or slot is machined on the outer surface of the pin connector. The box connector is machined to include tabs that accept the anti-rotation key. The box connector tab and pin connector pocket will line up after making up the connectors. The workers will then drive a key through the box connector tab and into the pin connector pocket. The key has a slightly greater thickness than the distance from the box connector tab to the innermost wall of the pin connector pocket, resulting in an interference fit. The workers typically will drive the key into place with a hammer. In some casing setups, the key inserts through a threaded hole in the box connector tab and a wrench may be employed to position and secure the key.

SUMMARY

A pipe connection includes a pin having external threads and a box having internal threads that mate with the external threads. A circumferential extending row of pin teeth are on an exterior portion of the pin. A key is located on the box, the key having at least one key tooth that engages the box teeth. The key is mounted to the box such that a portion of the key containing the key tooth is radially movable relative to the box so that the key tooth ratchets on the pin teeth during make-up of pin and the box. Each of the pin teeth has a saw-tooth configuration to resist unscrewing rotation of pin and the box.

The pin has an external downward-facing shoulder. The box has a rim that abuts the external shoulder at make-up of the pin and the box. The pin teeth encircle the pin between the external threads and the external shoulder. The portion of the key containing the key tooth is biased radially inward.

In one embodiment, the key is defined by at least one slot extending through a side wall of the box. In that embodiment, the key is an integral part of the side wall of the box. The make-up rotation of the pin and the box causes the portion of the key containing the key tooth to elastically flex relative to the side wall of the box.

In another embodiment, the key is a separate member from the box and mounted within a slot formed in a side wall of the box. A spring mounted to the box allows the key to flex radially outward in the slot. The spring may be a steel band extending circumferentially from one side to another side of the slot and across an outer side of the key. In another embodiment, the spring comprises a flexible plate mounted between the box and an outer side of the key adjacent one side edge of the key.

DETAILED DESCRIPTION

Figure 1:
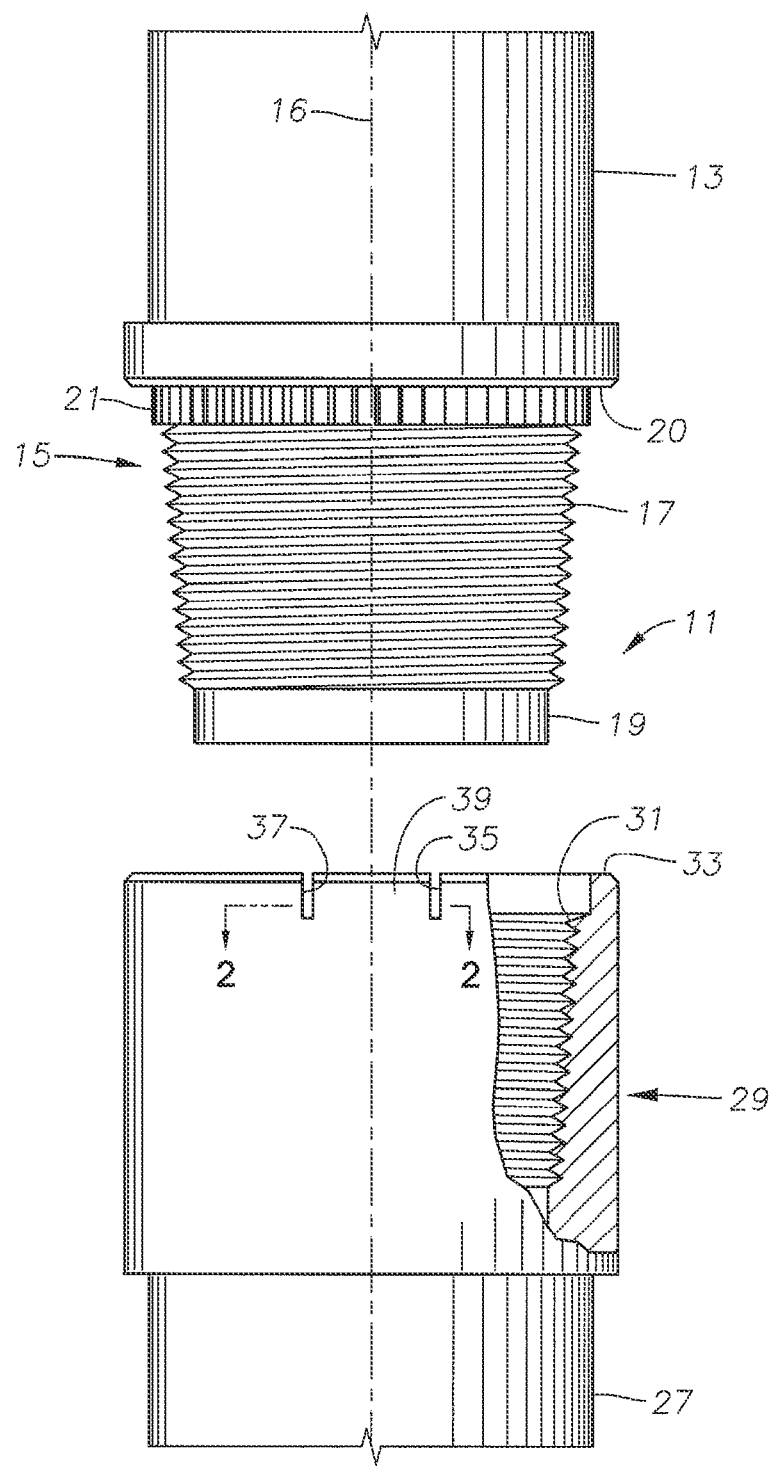
FIG. 1 is a side elevation view of a pipe connection in accordance with this disclosure.

Referring to FIG. 1, pipe connector 11 includes a pin 15 formed on a lower end of an upper pipe 13. The terms "upper" and "lower" are used only for convenience as pin 15 could be located on the upper end of pipe 13 if the pipe is inverted. Pin 15 has a longitudinal axis 16 and a set of external threads 17 located on a conical surface. Pin 15 has a nose 19 on a lower end below threads 17 and an external downward-facing shoulder 20 at an upper end of threads 17.

Figure 2:
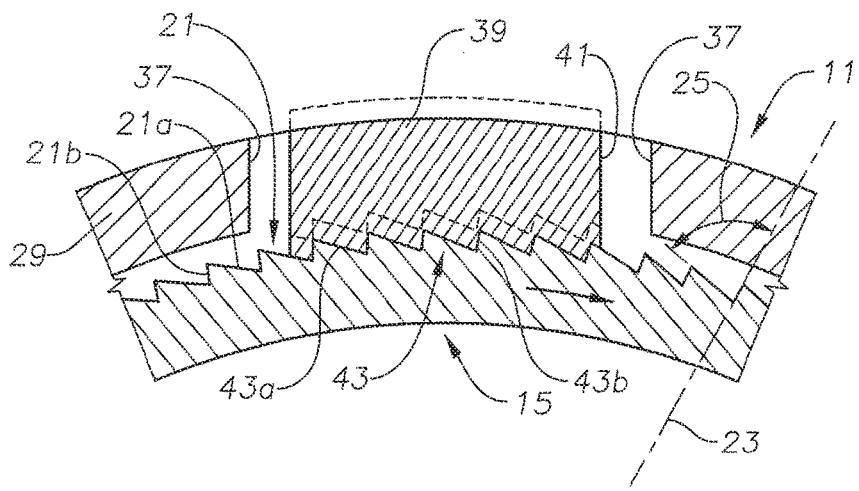
FIG. 2 is a cross-sectional view of the anti-rotation member of the pipe connection of FIG. 1, taken along the line 2-2 of FIG. 1.

A row of pin teeth 21 are formed on the exterior of pin 15 between external threads 17 and downward-facing shoulder 20. Pin teeth 21 extend circumferentially completely around pin 15. Referring to FIG. 2, pin teeth 21 are saw-tooth in shape. Each tooth of pin teeth 21 has a long flank 21a that joins a short flank 21b at a crest. Long flank 21a is longer than short flank 21b and also at a greater angle 25 relative to a radial line 23 emanating from axis 16 (FIG. 1) than short flank 21b. In the embodiment shown short flank 21b is located on radial line 23, thus at a zero degree angle relative to radial line 23. Angle 25 may vary and is illustrated as being about 60 degrees relative to radial line 23.

Referring again to FIG. 1, a lower pipe 27 has a box 29 on its upper end. Normally, each pipe 13, 27 will have a pin 15 on one end and a box 29 on the other end. Box 29 has internal threads 31 that mate with pin external threads 17. Box 29 has a rim 33 that abuts downward-facing shoulder 20 when pipe connection 11 is fully made up.

In this embodiment, two slits 35, 37 are cut through the side wall of box 29 from the outer side to the inner side of box 29. Slits 35, 37 are parallel to each other and to axis 16. Each slit 35, 37 extends downward from rim 33 a distance to a point about even with the upper end of internal threads 31. Slits 35, 37 will be axially aligned with pin teeth 21 when pipe connection 11 is made up, with the lower end of each slit 35, 37 located at or below pin teeth 21. The circumferential distance between slits 35, 37 may vary.

Slits 35, 37 define two sides of a tab or key 39. The lower portion of key 39 is integral with the side wall of box 29, and thus key 39 is of the same steel material. Referring to FIG. 2, slits 35, 37 define oppositely facing side edges 41 of key 39. There is no bottom edge for key 39 because the lower portion of key 39 is a part of the side wall of box 29. Key 39 has at least one, and preferably several teeth 43 extending across its width from side edge 41 to side edge 41. Key teeth 43 have the same saw-tooth configuration as pin teeth 21. Each key tooth 43 has a long flank 43a that joins a short flank 43b at a crest. The axial length of key teeth 43 is less than the axial length of slits 35 or 37. The upper edges of key teeth 43 may be approximately at the upper edge of key 39, which is flush with rim 33.

During the operation of the embodiment of FIGS. 1 and 2, as pin 15 is rotated in a make-up direction relative to box 29, threads 17 and 31 will make-up. The arrow in FIG. 2 indicates the normal make-up direction of rotation. When downward-facing shoulder 20 approaches rim 33, pin teeth 21 will engage key teeth 43. As indicated by the dotted lines in FIG. 2, key teeth 43 will ratchet or move between radially inward and outward positions relative to pin teeth 21 during make-up rotation. At least the lower portion of key 39 will elastically flex or bend, allowing the portion containing teeth 43 to move inward and outward relative to box 29. The resiliency of key 39 biases key 39 to the inward position.

The large angle 25 of long flanks 21a, 43a, which may be considered to be leading flanks, enables the ratcheting action to occur. Once fully made up, any tendency for unscrewing rotation to occur is resisted by the engagement of short flanks 21b, 43b. Because of the small or zero angle of short flanks 21b, 43b relative to radial line 23, there would be only a small outward directed force component tending to push the upper part of key 39 radially outward in response to an unscrewing rotation. For unscrewing rotation, short flanks 21b, 43b become the leading flanks.

Normally, pipe connection 11 is not unscrewed once made up. On some occasions, however, the operator wishes to unscrew pipe connection 11. If so, applying a large left-hand torque to pin 15 will cause ratcheting of key 39 to occur. Alternately, the portion of key 39 containing teeth 43 may be pulled radially outward to disengage key teeth 43 from pin teeth 21. Key 39 could be pried outward with a tool entering slits 35 or 37. Alternately, a threaded hole (not shown) could be located on the outer side of key 39 for engaging a threaded end of a pulling tool.

Figure 3:
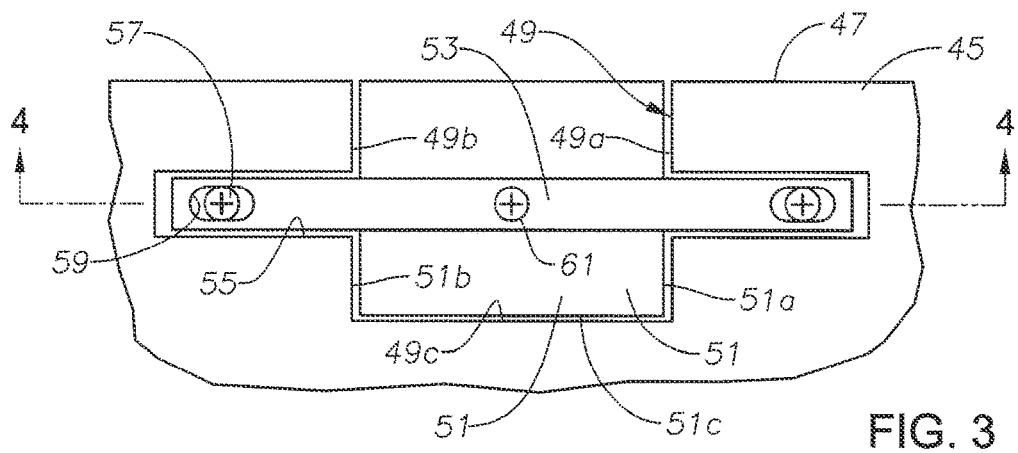
FIG. 3 is an enlarged partial side elevation view of a first alternate embodiment of an anti-rotation member in accordance with this disclosure.
Figure 4:
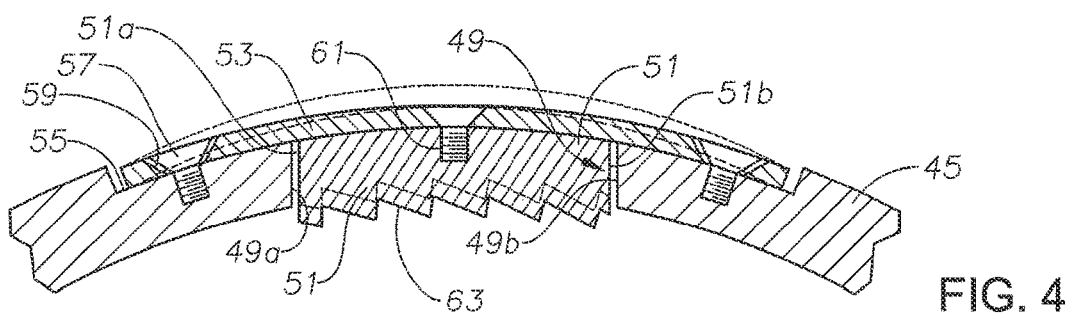
FIG. 4 is a sectional view of the anti-rotation member of FIG. 3, taken along the line 4-4 of FIG. 3.

A second embodiment is illustrated in FIGS. 3 and 4. Box 45 has a rim 47 and internal threads (not shown) as in the first embodiment. A slot 49 of much greater circumferential width than either slit 35, 37 (FIG. 2) is notched or cut into box 45. The circumferential width of slot 49 may be about the same as the distance from slit 35 to slit 37. Slot 49 has two parallel axially extending side edges 49a, 49b. Side edges 49a, 49b may be spaced apart about the same distance as slits 35, 37 of the first embodiment. Slot 49 has a bottom edge 49c that is parallel to rim 47 and joins side edges 49a, 49b.

A completely separate key 51 is formed with only slightly smaller dimensions than slot 49. Key 51 is generally rectangular, having two axially extending side edges 51a, 51b and a circumferentially extending bottom edge 51c. The outer side of key 51 may be flat or a portion of a cylinder with the same diameter as the outer side of box 45. Referring to FIG. 4, key 51 has at least one and preferably several teeth 63 formed on its inner side. Teeth 63 are saw-tooth in configuration and may be identical to key teeth 43 (FIG. 2) of the first embodiment.

Referring again to FIG. 3, key 51 is biased to an inward position by a spring 53. Spring 53 is a circumferentially extending band or strip of spring steel. Each end of spring 53 is located in a shallow recess 55 in the outer surface of box 45 adjacent one of the slot side edges 49a, 49b. Spring 53 has a greater circumferential width than key 51 and extends completely across the outer side of key 51. Spring 53 is shown about equidistant between key bottom edge 51c and the upper edge of key 51, which is flush with box rim 47. However, spring 53 could be positioned closer to or farther from bottom edge 51c. A screw 57 extends through an elongated aperture 59 near each end of spring 53 into box recess 55 to fasten spring 53 to box 45. A screw 61 extends through a hole in spring 53 into a mating hole in the outer side of key 51 to secure key 51 to spring 53.

The pin (not shown) for the embodiment of FIGS. 3 and 4 may be identical to pin 15. The make-up operation of the embodiment of FIGS. 3 and 4 is the same as the first embodiment. The dotted lines in FIG. 4 illustrate the ratcheting action of key teeth 63. The elongated apertures 59 for screws 57 enable spring 53 to more inward and outward relative to box 45. Unlike the first embodiment, the entire key 51 moves between inner and outer positions while ratcheting. To unscrew box 45, the operator removes screws 57, 61, then removes key 51 from slot 49.

Figure 5:
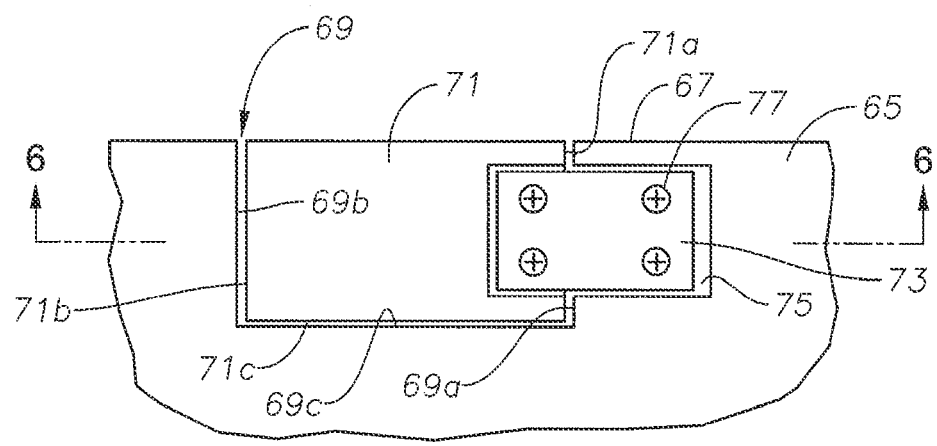
FIG. 5 is a partial side elevation view of a second alternate embodiment of an anti-rotation member in accordance with this disclosure.
Figure 6:
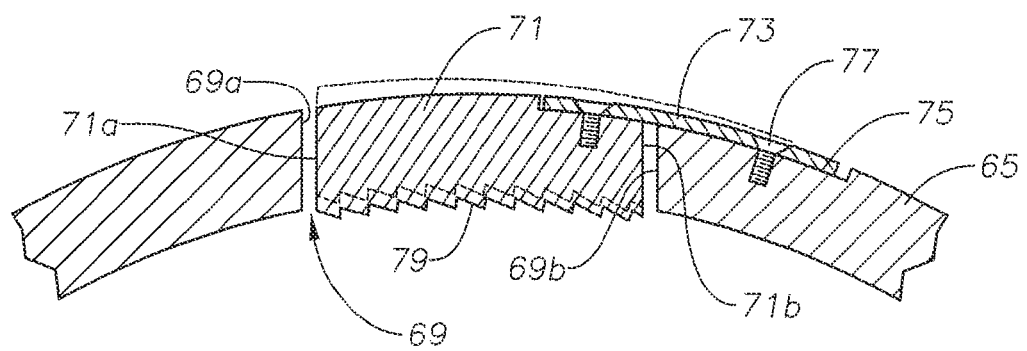
FIG. 6 is a cross-sectional view of the anti-rotation member of FIG. 5, taken along the line 6-6 of FIG. 5.

A third embodiment is illustrated in FIGS. 5 and 6. Box 65 has a rim 67 and internal threads (not shown). A slot 69 similar to slot 49 (FIG. 3) is cut through the side wall of box 65 at rim 67. Slot 69 is generally rectangular, having axially extending side edges 69a, 69b and a bottom edge 69c parallel with rim 67.

A key 71 is formed separately from box 65 for location in slot 69. Key 71 has parallel axially extending side edges 71a, 71b and a bottom edge 71c in a plane perpendicular to side edges 71a, 71b. A solid hinge that is a flexible steel plate 73 attaches key 71 to box 65. Plate 73, however, is attached to only one side of key 71, similar to a gate or door hinge. Half of plate 73 is located in a shallow recess 75 in the outer surface of box 65. Recess 75 extends circumferentially from slot side edge 69a and also is located on the outer side of key 71 near key side edge 71a. Screws 77 extend through holes in plate 73 into mating threaded holes in recess 75. The other half of plate 73 secures to the outer side of key 71 in holes in the portion of recess 75 located on the outer side of key 71.

Referring to FIG. 6, key 71 has a plurality of teeth 9 that may have the same configuration as teeth 63 (FIG. 4) and teeth 43 (FIG. 2). Teeth 79 are also saw-toothed in shape. Key 71 is thus fastened to box 65 at only one side edge 71a, which is a leading side edge considering the direction of make-up rotation. The pin will be the same as in the first embodiment. During the make-up rotation, trailing key side edge 71b moves radially inward and outward, enabling key teeth 79 to ratchet, as indicated by the dotted lines in FIG. 6. Plate 73 flexes elastically during make-up and urges key 71 to the inward position. To unscrew the connection of FIGS. 5 and 6, an operator removes plate 73, then the entire key 71.

While the disclosure has been shown in only three of its forms, it should be apparent to those skilled in the art that it is not so limited but is susceptible to various changes without departing from the scope of the disclosure.

What is claimed is:
1. A pipe connection, comprising:
a pin having external threads, a nose portion at an end of the pin on a first side of the external threads, an external shoulder on a second side of the external threads, and a longitudinal axis;

a box having internal threads that mate with the external threads and a rim at the end of the box that abuts the external shoulder at make-up of the pin and the box;

a circumferentially extending row of pin teeth on an exterior portion of the pin, the pin teeth encircling an outer diameter of the pin and located axially between the external threads and the external shoulder;

a key on the box, the key being rigid and having at least one key tooth that engages the pin teeth;

the key being mounted to the box such that a portion of the key containing the at least one key tooth is radially movable relative to the box so that the at least one key tooth ratchets on the pin teeth during make-up of the pin and the box; and each of the pin teeth having a saw-tooth configuration to resist unscrewing rotation of the pin and the box;

wherein the key is a separate member from the box and mounted within a slot formed in a side wall of the box; and the pipe connection further comprises:

a spring mounted to the box and secured to the key that allows the key to move radially outward in the slot while the key maintains an original shape of the key, wherein the spring comprises a steel band extending circumferentially from one side to another side of the slot and across an outer side of the key.

2. The pipe connection according to claim 1, wherein:
each of the pin teeth has a short flank and a long flank, the long flank being longer in a circumferential direction than the short flank.

3. The pipe connection according to claim 1, wherein:
each of the pin teeth has a leading flank and a trailing flank relative to make-up rotation of the pin and the box; and
each of the leading flanks is at a greater angle relative to a radial line emanating from the longitudinal axis and passing through each of such leading flanks, than each of the trailing flanks.

4. The pipe connection according to claim 1, wherein the portion of the key containing the at least one key tooth is biased radially inward.

5. A pipe connection, comprising:
a pin having external threads and a longitudinal axis;
a box having internal threads that mate with the external threads;
a circumferentially extending row of pin teeth on an exterior portion of the pin;
a slot extending through a side wall of the box from an outer side to an inner side of the box;
a key carried in the slot, the key being rigid and having a row of key teeth that mate with the pin teeth;
the key being mounted to the box such that the key is radially movable relative to the box between radially outward and radially inward positions;
a separate spring mounted to the box and secured to the key that allows the key to move radially between the inward and the outward positions while maintaining an original shape of the key, the key being biased toward the inward position with the spring so that the key teeth ratchet on the pin teeth during make-up of the pin and the box; and
each of the pin teeth and the key teeth having a saw-tooth configuration to resist unscrewing rotation of pin and the box.

6. The pin connection according to claim 5, wherein:
the pin has a nose portion at an end of the pin on a first side of the external threads, and an external shoulder on a second side of the external threads;
the box has a rim at the end of the box that abuts the external shoulder at the make-up of the pin and the box; and
the pin teeth encircle an outer diameter of the pin axially between the external threads and the external shoulder.

7. The pipe connection according to claim 5, wherein:
the spring comprises a steel band extending circumferentially from one side to another side of the slot and across an outer side of the key.

\* \* \* \* \*